United States Patent
Witt et al.

(10) Patent No.: US 6,914,221 B1
(45) Date of Patent: Jul. 5, 2005

(54) SYSTEM AND METHOD FOR WARMING FOOD

(75) Inventors: Allan Witt, Lenoir, NC (US); William Citti, Brookfield, WI (US); David Rolston, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 0 days.

(21) Appl. No.: 10/763,751

(22) Filed: Jan. 23, 2004

(51) Int. Cl.[7] ............................................. F27D 11/00
(52) U.S. Cl. ..................... 219/433; 219/218; 219/443.1
(58) Field of Search ....................... 392/441; 219/441, 219/443.1, 217, 218, 403, 430

(56) References Cited

U.S. PATENT DOCUMENTS

| | | | | |
|---|---|---|---|---|
| 3,931,494 A | * | 1/1976 | Fisher et al. ................. | 219/441 |
| 4,237,368 A | * | 12/1980 | Welch ..................... | 219/448.17 |
| 4,794,228 A | * | 12/1988 | Braun, Jr. ................... | 219/415 |
| 5,413,032 A | * | 5/1995 | Bruno et al. .................. | 99/331 |
| 6,528,768 B1 | * | 3/2003 | Simic-Glavaski et al. .. | 219/438 |

OTHER PUBLICATIONS

Chameleon® 12 Liter Refrigerator and Warmers, The Cellar Store, printed from website www.thecellarstore.com on Dec. 29, 2003, 3 pages.

DECO–TECH Air Curtain Cold Pan, May 2000, 2 pages, Revision 2.3, Kevry Corporation, Innovative Design and Fabrication, U.S.A.

Plug–in Thermoelectric Mini Cooler and Warmer (9–Can), printed from website www.asseenontvandmore.com on Nov. 19, 2003, 3 pages.

* cited by examiner

Primary Examiner—Thor S. Campbell
(74) Attorney, Agent, or Firm—Foley & Lardner LLP

(57) ABSTRACT

The present invention relates to a system comprising at least one serving dish configured to support food and a power source which comprises at least one portable electrical power generating device. The power source provides power to heat the food.

43 Claims, 4 Drawing Sheets

SYSTEM AND METHOD FOR WARMING FOOD

BACKGROUND

The present description relates to systems and methods for warming food. In particular, the present description relates to systems and methods for warming foods using a battery, fuel cell, solar, and/or other portable electric power producing device as a power source.

Over the years, a number of advances have been made in how food is cooked and served. In many situations, food is initially cooked at high temperatures and then served to those that will eat the food. The food may be served using a buffet to allow people a greater amount of choice in what they eat as well as how much they eat. One example of such a situation is a buffet style restaurant. Patrons of a buffet style restaurant move between various buffet tables and choose the food that appeals to them. Unfortunately, when food is served, it may become cold before it is completely consumed. This is particularly a problem in a buffet style setting. In general, cold food is less appealing to people than hot food, and food that is not heated properly poses a greater risk of microbial contamination, which may cause sickness or other health problems. Once the food is cold, it is typically either reheated or discarded resulting in a significant amount of waste both in terms of food and efficiency.

In an effort to counter this problem, various devices have been developed to maintain the food at a certain temperature. In one of these devices, the food is warmed using an open flame positioned directly underneath a serving dish. The flame heats the bottom of the serving dish and thus heats the food inside it. These devices use flammable materials such as propane or alcohol based fluid or gels to create the flame. In another device, the food is warmed using an electrical heating element which is plugged into an electrical outlet.

While these devices are generally effective there are some drawbacks. For example, the use of an open flame presents the risk of burning someone or starting a fire. Also, combustion of the various fuels may give off harmful gases. Using electric power from an outlet may not provide a workable solution where power is not readily available (e.g., a picnic, cookout, etc.). Also, electric power from an outlet may require placing electrical cords across walkways or other places where there is foot traffic. The exposed cords pose a tripping hazard to those walking nearby. Accordingly, it would be desirable to provide an improved system and method for warming food.

It should be understood that the claims define the scope of the subject matter for which protection is sought, regardless of whether any of the aforementioned disadvantages are overcome by the subject matter covered by the claims. Also, the terms recited in the claims should be given their ordinary and customary meaning as would be recognized by those of skill in the art, except, to the extent a term is used herein in a manner more expansive than its ordinary and customary meaning, the term should be given its ordinary and customary meaning plus the additional expansive meaning, or except if a term has been explicitly defined to have a different meaning by reciting the term followed by the phase "as used herein shall mean" or similar language. Accordingly, the claims are not tied to any particular embodiment, feature, or combination of features other than those explicitly recited in the claims.

SUMMARY

One embodiment relates to a system comprising at least one serving dish configured to support food and a power source which comprises at least one portable electrical power generating device. The power source provides power to heat the food.

Another embodiment relates to a system comprising a counter, at least one heating element in thermal communication with the counter, and a power source which comprises a portable electrical power generating device and which is configured to provide power to the heating element.

Another embodiment relates to a system comprising at least one container supporting food, at least one heating element indirectly heating the food, and at least one fuel cell configured to provide direct current power to the heating element.

Another embodiment relates to a system comprising at least one container supporting food and at least one battery configured to provide power to heat the food in the container to at least approximately 185° F.

Another embodiment relates to a chafing dish which supports food and uses at least one of a battery and a fuel cell to heat the food.

Another embodiment relates to a chafing dish supporting food and using direct current power to heat the food.

Another embodiment relates to a serving cart comprising a surface, at least one heating element which heats the surface, and a power source which comprises at least one of a battery and a fuel cell. The power source is configured to provide power to the heating element.

Another embodiment relates to a method of serving food comprising positioning a plurality of serving dishes adjacent to one another on a counter and heating food in the plurality of serving dishes using at least one of a battery and a fuel cell. The serving dishes comprise various types of food.

Another embodiment relates to a system comprising a counter which comprises quartz, at least one heating element in thermal communication with the counter, and a power source which provides power to the heating element.

DRAWINGS

DETAILED DESCRIPTION

The present description is provided in the context of systems and methods of heating food using a battery and/or a fuel cell. In particular, the use of at least one battery and/or at least one fuel cell is described in connection with heating food in a buffet setting (e.g., food displayed on a buffet table, etc.). However, the systems and methods described herein may be widely applicable beyond the particular details and embodiments described herein. Accordingly, the following description should be considered representative of the many uses and configurations of the systems and methods described herein. Also, it should be understood that the various features from one embodiment or example may be combined with one or more features from one or more other embodiments or examples to create additional embodiments unless expressly stated otherwise.

Figure 1:
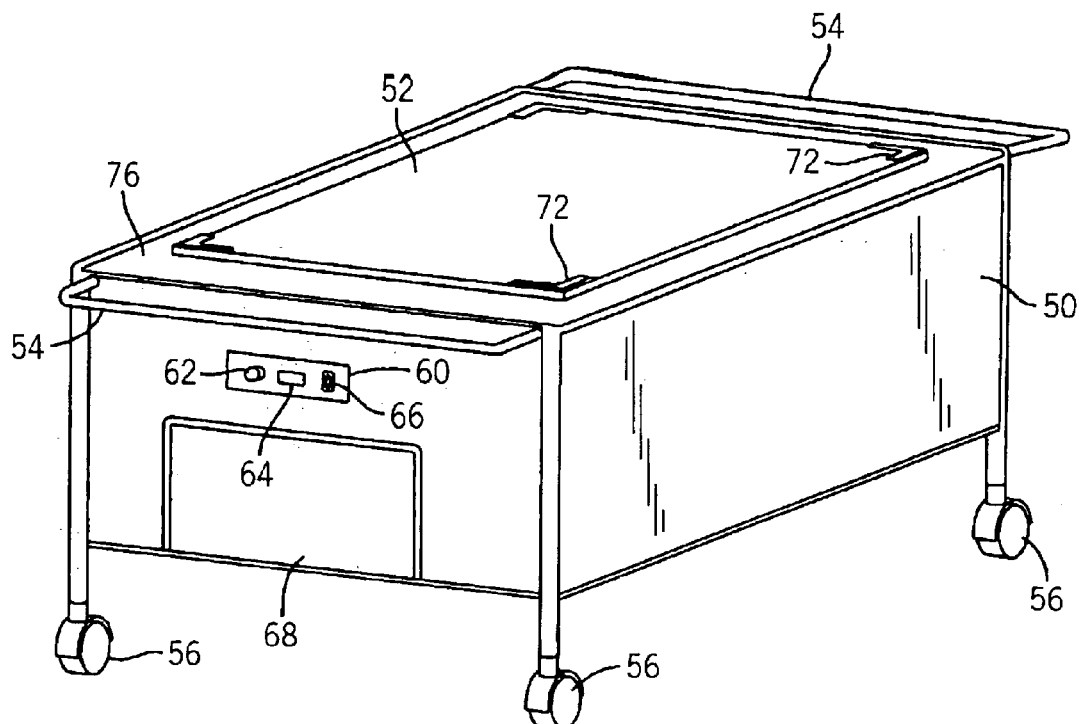
FIG. 1 is a perspective view of a serving cart which is configured to heat food using a battery and/or a fuel cell according to one embodiment.

Referring to FIG. 1, a system is shown for heating food according to one embodiment. In particular, the system comprises a serving cart 50 which is portable. FIG. 1 provides a perspective view of serving cart 50. Serving cart 50 comprises a top surface or counter 52, handles 54, and wheels 56. Serving cart 50 also includes a power source 58 (FIG. 3), which is configured to provide power to heat surface 52. Access door 68 provides access to power source 58. A control panel 60 is used to control the heating of surface 52. Control panel 60 comprises a knob 62, display 64, and on/off switch 66. Knob 62 is used to adjust the temperature of surface 52. Display 64 may be used to indicate the temperature of surface 52. Control panel 60 may also be configured in a variety of ways that are readily apparent to those of ordinary skill in the art. For example, control panel 60 may comprise membrane buttons to input the temperature settings, etc.

Surface 52 is used to hold one or more containers 70 (FIG. 5) of food. As an initial note, containers 70 may include a variety of dishes (e.g., serving dish, pizza pan, etc.) and may be used in conjunction with a variety of systems for heating food (e.g., chafing dish, bain-marie, table dish warmer, etc.). In a typical situation, surface 52 is configured to hold a plurality of containers 70 comprising a variety of different foods adjacent to one another. Users may choose from the food provided in containers 70 as the user moves alongside serving cart 50. In another embodiment, multiple serving carts 50 may be placed adjacent to one another to provide additional capacity to serve even more food. Surface 52 is heated to a sufficient temperature to maintain the food in containers 70 at a desired temperature. In one embodiment, the temperature of surface 52 is at least approximately 140° F., at least approximately 160' F, or, desirably, at least approximately 180° F., or, suitably, at least approximately 200° F., or, even more suitably, at least approximately 240° F. The food in containers 70 may be heated to at least approximately 140° F., at least approximately 185° F., or at least approximately 200° F. Also, it should be understood that the term heat or heating is meant to include maintaining food at a temperature higher than the ambient temperature (e.g., the food is already heated by cooking and only needs to be maintained at an elevated temperature). In another embodiment, food may be placed directly on surface 52. The food may be heated or maintained at the appropriate level by heating surface 52.

Figure 2:
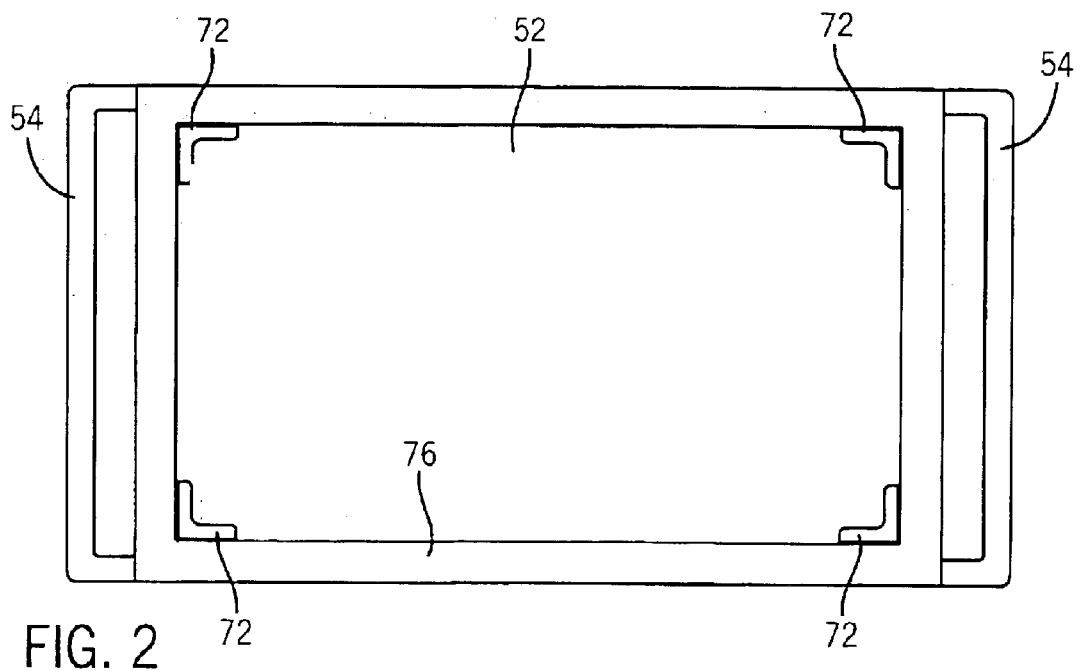
FIG. 2 is top view of the serving cart of FIG. 1.

Surface 52 may comprise a variety of suitable materials. In general, surface 52 comprises a material that is capable of being heated without substantial adverse effects such as cracking, warping, etc (e.g., glass, etc.). In one embodiment, surface 52 may comprise stone which may include natural stone and/or engineered stone. Stone provides an aesthetically pleasing look as well as being durable. The term "engineered stone" as used herein means materials comprising at least approximately 80 wt. % quartz and at least approximately 2 wt. % organic resin (e.g., phenolic resin, polyester resin, etc.). In one embodiment, engineered stone comprises approximately 90–93 wt. % of quartz and approximately 7–10 wt. % polyester resin (e.g., engineered stone available from Dupont under the tradename "Zodiaq," or similarly engineered stone available from Cosentino USA, Inc. of Stafford, Tex. under the tradename "Silestone," etc.). In another embodiment, regardless of whether surface 52 is considered to be stone or engineered stone, surface 52 is configured to comprise quartz. Further, in yet another embodiment, surface 52 may be a decorative surface material that may be heated without substantial degradation. As shown in FIGS. 1 and 2, surface 52 may comprise corner protectors 72 to prevent the stone from being chipped or cracked by, for example, colliding with one of containers 70.

Figure 5:
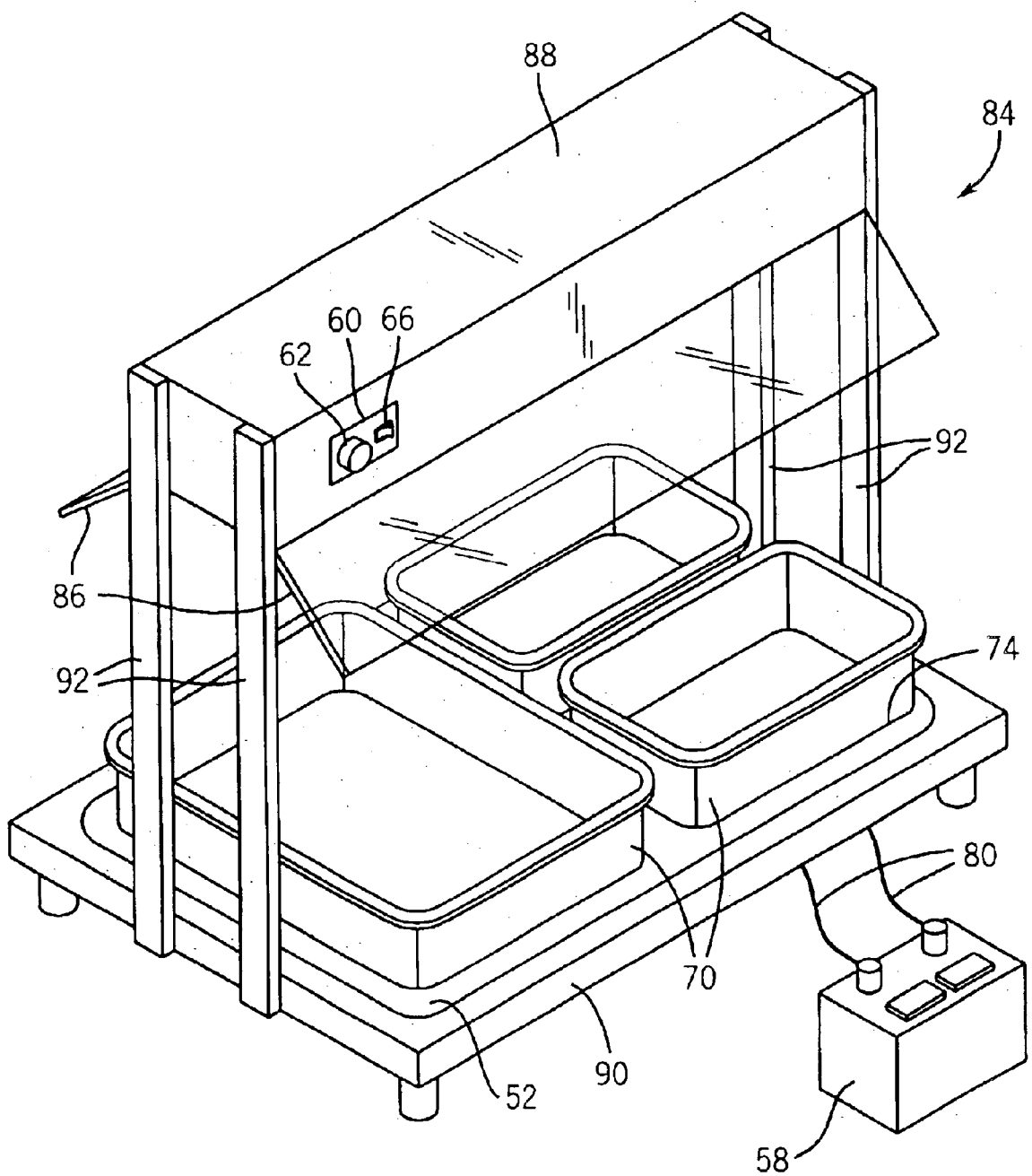
FIG. 5 is a perspective view of a serving station which is configured to heat food using a battery and/or a fuel cell according to another embodiment.

Referring to FIG. 2, surface 52 is shown from a top view. As shown in FIGS. 1 and 2, surface 52 is substantially flat, which makes it simple to clean and maintain. However, in other embodiments surface 52 may be any suitable geometry. For example, surface 52 may comprise recesses which are slightly larger in shape than a bottom side 74 of container 70 (FIG. 5). Container 70 fits within the recesses to provide greater stability to container 70 as users remove food.

Figure 3:
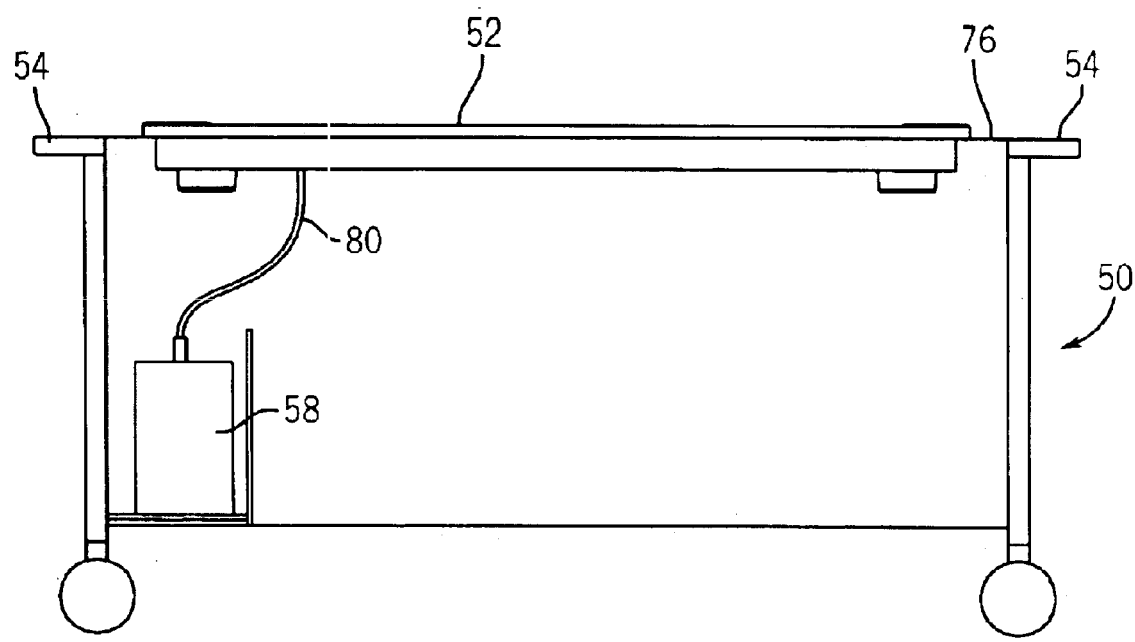
FIG. 3 is a cross-sectional side view of the serving cart of FIG. 1.

Referring to FIG. 3, a cross-sectional side view of serving cart 50 is shown. As shown in FIGS. 1 and 3, surface 52 is separate and raised above the unheated top surface 76 of serving cart 50. Typically, unheated top surface 76 is made of an electrically conducting material (e.g., stainless steel, etc.). Surface 52 may be thermally and/or electrically insulated from unheated surface 76. Therefore, at the interface between surface 52 and unheated surface 76 a suitable insulating material may be provided to prevent heat transfer between the two surfaces.

Power source 58 is configured to provide electrical energy to heat surface 52. In one embodiment, power source 58 is configured to provide direct current power (e.g., 12 Volt) to heat surface 52. As shown in FIG. 3, power source 58 comprises at least one battery. The battery may be any suitable battery to provide the desired power output, which, of course, will depend on a variety of factors such as the size of surface 52 and the ambient environment conditions. In one embodiment, the battery may be a 150 amp-hour battery which provides enough power to heat three square feet of surface 52 for approximately 5 hours at 240° F. In another embodiment, the battery may be at least approximately a 100 amp-hour battery, 150 amp-hour battery, 200 amp-hour battery, or 250 amp-hour battery. In general, a battery with more amp-hours can heat surface 52 longer. In another embodiment, the battery may be a deep cycle battery. In still other embodiments, power source 58 may comprise a fuel cell (e.g., hydrogen fuel cell such as a proton exchange membrane fuel cell, alkaline fuel cell, phosphoric acid fuel cell, etc.) or photovoltaic cells (e.g., photovoltaic cells may be used to directly heat surface 52, they may be used to recharge the battery, etc.). In those embodiments comprising a photovoltaic cell, the photovoltaic cell may be mounted to serving cart 50 (e.g., mounted above the cart in position to receive radiation from the sun, etc.). In yet another embodiment, the power source may include electrical generation devices which are movable and therefore portable.

Figure 4:
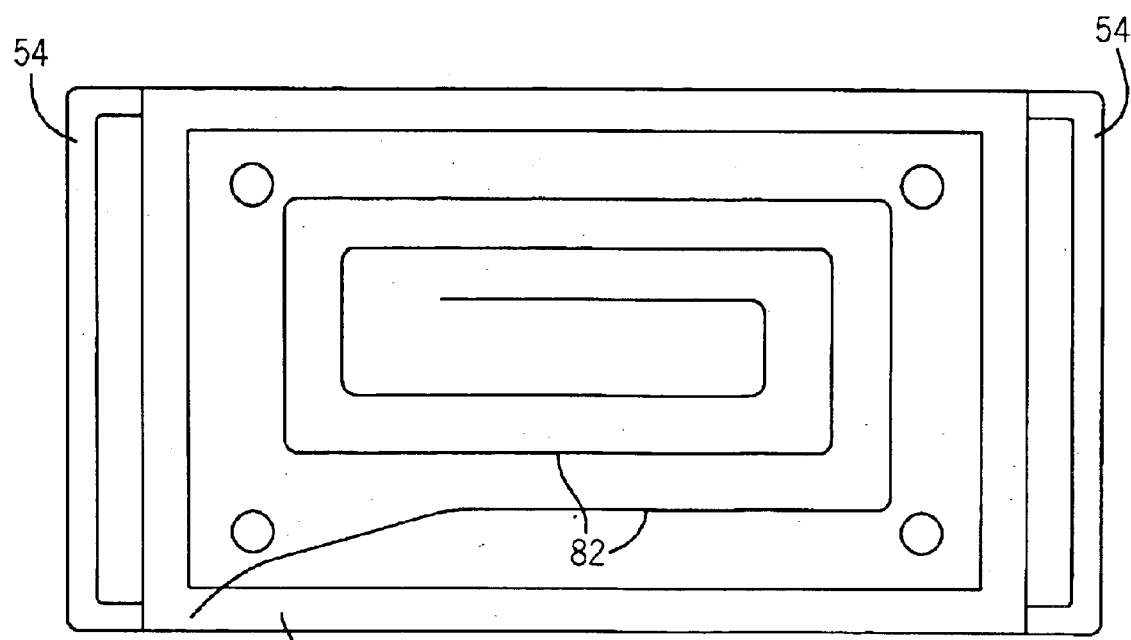
FIG. 4 is a bottom view of the serving cart of FIG. 1.

Referring to FIG. 4, a bottom side 78 of surface 52 is shown. As shown in FIGS. 3 and 4, wires 80 extend from power source 58 to bottom side 78 of surface 52. Wires 80 transmit power to one or more heating elements 82, which are attached to surface 52 and provide heat to surface 52. Heating element 82 typically comprises one or more wires with sufficiently high resistance to cause the temperature of the wire to increase as electricity is passed through it. Typically, heating element 82 is enclosed by a material such as aluminum foil. In other embodiments, heating element 82 may be configured to be inside surface 52 (e.g., manufactured inside surface 52, etc.). For example, heating element 82 may be enclosed by surface 52 which comprises at least approximately 80 wt. % quartz and at least approximately 2 wt. % organic resin.

By now it should be apparent that there are many different embodiments and configurations for heating food with a battery and/or a fuel cell. Additional embodiments may include additional features that may be provided with serving cart 50, or additional configurations for heating food using some other system that does not include serving cart 50. For example, in other embodiments, additional features may be included as part of serving cart 50 such as lighting positioned above surface 52. The lighting may be used to simply provide additional light or may be used to provide light and heat. In the latter situation, the food in containers 70 is heated both by the overhead heat lamps and surface 52. In other embodiments, a fixed buffet table may be used instead of serving cart 50. In this embodiment, power source 58 may be placed underneath the table (desirably in some type of enclosure to make it more aesthetically pleasing) and used to provide power to heat surface 52. In additional embodiments, surface 52 may not be heated. Rather, heating elements 82 may be placed directly on containers 70 which are placed on surface 52.

Referring to FIG. 5, a perspective view of another system for heating food using a battery and/or fuel cell is shown. In particular, a serving station 84 is shown which comprises a base 90 and a lighting apparatus 88. Lighting apparatus 88 is fixed to base 90 using support members 92. Base 90 comprises surface 52, which is configured to support containers 70. Surface 52 may be configured in any of the numerous ways described in connection with serving cart 50 (e.g., surface 52 is heated using heating element 82, etc.). In general, power source 58 is configured to be used to heat surface 52 and, thus, heat the food in containers 70. Serving station 84 shown in FIG. 5 is portable. Also, in one embodiment, serving station 84 may be partially disassembled to make it easier to transport (e.g., lighting apparatus 88 is removable from base 90).

Lighting apparatus 88 comprises lights (not shown) and control panel 60. Control panel 60, in this embodiment, is configured to control the temperature of surface 52 as well as the lights. Accordingly, control panel 60 may include all of the options and features as described previously in connection with serving cart 50. The lights are typically heat lamps, which are configured to assist in heating the food in containers 70. Also, lighting apparatus 88 is coupled to breath protectors 86, which are generally configured to prevent matter from a users eyes, mouth, nose, etc. from contaminating the food.

The particular details, design, and features of serving station 84 may be varied in a number of ways. For example, in one embodiment, serving station 84 may be configured without lighting apparatus 88. Rather, serving station 84 may be configured to include only base 90. Also, serving station 84 may not be portable. Instead, it may be fixedly mounted to a table or serving island (e.g., a serving island in a buffet restaurant, etc.). Other variations that would be recognized by those of ordinary skill may also be made to serving station 84 shown in FIG. 5.

Figure 6:
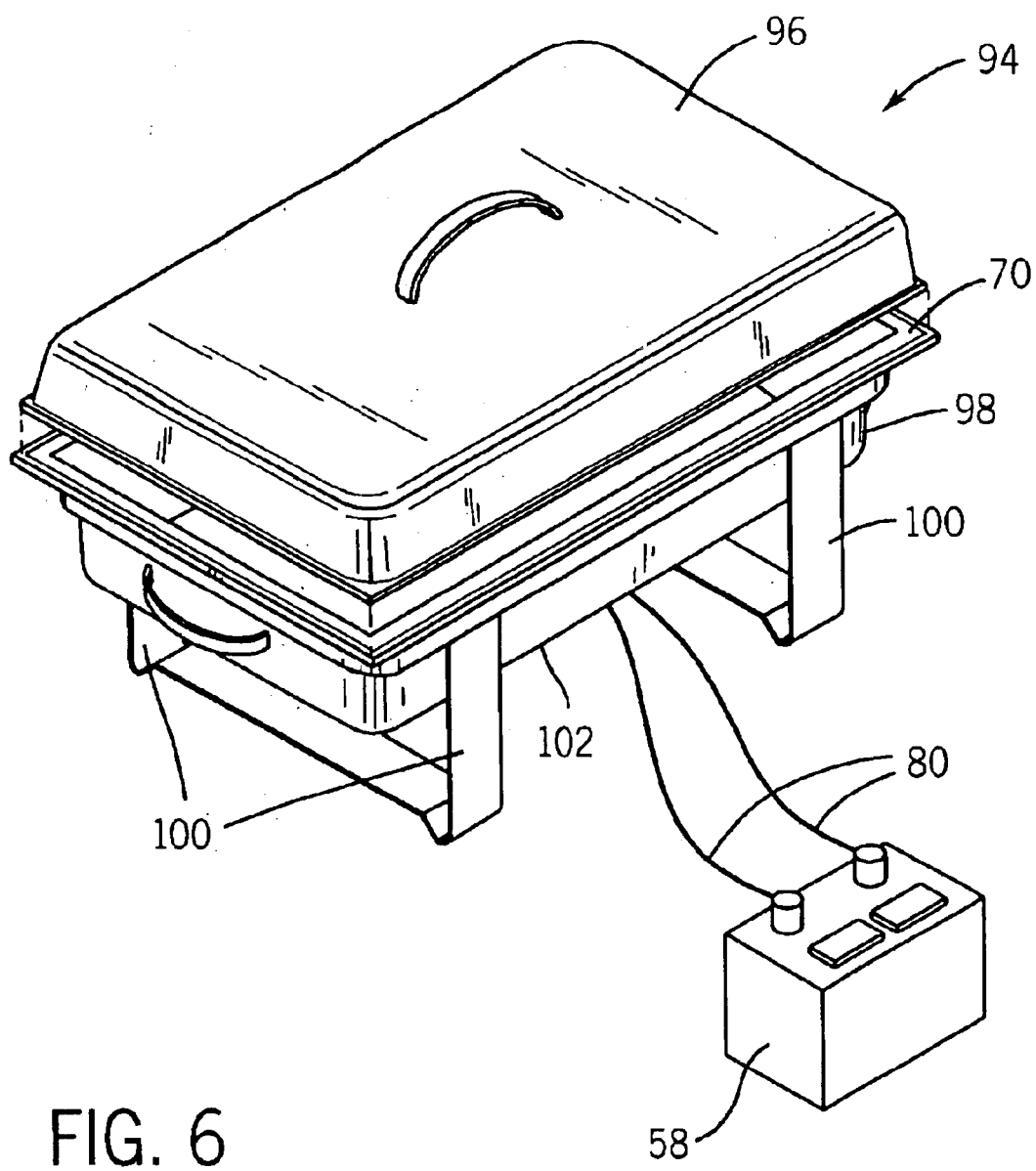
FIG. 6 is a perspective view of a chafing dish which is configured to heat food using a battery and/or a fuel cell according to another embodiment.

Referring to FIG. 6, another system is shown for heating food using a battery and/or a fuel cell. In this embodiment, a chafing dish 94 is heated using power source 58. Chafing dish 94 comprises cover 96, holder 98, container or serving dish 70, and support members 100. Chafing dish 94 is typically used to heat a single food item. A portable buffet may be created using one or more chafing dishes 94 to serve food at locations where it would otherwise be difficult to keep the food warm (e.g., outdoor weddings, conference rooms, etc.).

Chafing dish 94 is configured to hold food in container 70. The food is heated using one or more heating elements 82 which are positioned on a bottom side 102 of holder 98. Power source 58 provides power to heating elements 82, which heat the food. In one embodiment, power source 58 is a battery and/or a fuel cell. In another embodiment, power source 58 provides direct current power to heating elements 82. Typically, container 70 may be easily removed from holder 98. Thus, a full container 70 may be easily swapped for an empty container 70. Cover 96 is used to cover the food in container 70 until it is ready to be served. Thus, cover 96 prevents some heat loss as well as protecting the food from insects and the like. In one embodiment, the space between container 70 and holder 98 comprises water, which is heated to provide more uniform heating of the food in container 70.

Other embodiments beyond the particular details of chafing dish 94 may also be used to heat food using a battery and/or a fuel cell. For example, in one embodiment, chafing dish 94 may be substantially round. In another embodiment, cover 96 of chafing dish 94 may be rotatably mounted to holder 98. For example cover 96 and holder 98 may be shaped similar to a cylinder split in half longitudinally. When cover 96 is positioned over holder 98, chafing dish 94 is shaped similarly to a cylinder. Cover 96 may then be rotated about an axis that extends longitudinally in the middle of the cylinder shaped chafing dish 94. This provides for easy storage of cover 96 when not in use.

The construction and arrangement of the elements described herein are illustrative only. Although only a few embodiments have been described in detail in this disclosure, those of ordinary skill who review this disclosure will readily appreciate that many modifications are possible without materially departing from the novel teachings and advantages of the subject matter recited in the claims. Accordingly, all such modifications are intended to be included within the scope of the methods and systems described herein. The order or sequence of any process or method steps may be varied or re-sequenced according to alternative embodiments. Other substitutions, modifications, changes and omissions may be made in the design, operating conditions and arrangement of the embodiments without departing from the spirit and scope of the methods and systems described herein.

What is claimed is:

1. A system comprising:
   a counter comprising stone;
   at least one heating element in thermal communication with the counter; and
   a power source which comprises a portable electrical power generating device, the power source being used to provide power to the heating element.

2. The system of claim 1, wherein the power source comprises at east one of a battery or a fuel cell.

3. The system of claim 1, comprising a serving cart which includes the counter and the power source.

4. The system of claim 1, wherein the counter comprises quartz.

5. The system of claim 1, wherein the heating element is positioned on a bottom side of the counter.

6. The system of claim wherein the power source provides direct current power to the heating element.

7. A serving cart comprising:
   a surface which comprises stone;
   at least one heating element which heats the surface; and
   a power source which comprises at least one of a battery or a fuel cell, the power source being used to provide power to the heating element.

8. The serving cart of claim 7, wherein the surface comprises quartz.

9. The serving cart of claim 7, wherein the combination of the power source and the heating element is configured to maintain the surface at a temperature of at least 140° F. for at least 4 hours.

10. A method of serving food comprising:

positioning a plurality of serving dishes adjacent to one another on a counter which comprises engineered stone, the serving dishes comprising various types of food; and heating food in the plurality of serving dishes using at least one of a battery or a fuel cell, the battery being used to heat the engineered stone and thus heat the food.

11. The method of claim 10, wherein the positioning step comprises positioning the plurality of serving dishes on a serving cart.

12. A system comprising:

a counter which comprises quartz and at least approximately 2 wt. % organic resin;

at least one heating element in thermal communication with the counter; and a power source which provides power to the heating element.

13. The system of claim 12, wherein the counter comprises at least approximately 80 wt. % quartz.

14. The system of claim 13, wherein the counter is included with a serving cart.

15. The system of claim 12, wherein the heating element is enclosed by counter.

16. A system comprising:

a surface which comprises engineered stone;

at least one heating element which is used to heat the surface; and a power source which provides power to the heating element.

17. The system of claim 16, wherein the heating element is enclosed by surface.

18. The system of claim 16 wherein the heating element is positioned on a bottom side of the surface.

19. The system of claim 16, wherein the power source is a portable power source.

20. The system of claim 19, wherein the power source comprises at least one of a battery, fuel cell, or a photovoltaic cell.

21. The system of claim 16, wherein the surface is part of a serving cart.

22. A serving cart comprising:

a surface which comprises quartz;

at least one heating element which is used to heat the surface; and a power source which includes a portable electrical power generating device, the power source being used to provide power to the heating element.

23. The serving cart of claim 22, wherein the surface comprises at least approximately 80 wt. % quartz.

24. The serving cart of claim 22, wherein the surface comprises at least approximately 2 wt. % organic resin.

25. The serving cart of claim 22, wherein the power source is capable of maintaining the surface at a temperature of at least 140° F. for at least 4 hours.

26. The serving cart of claim 22, wherein the heating element is positioned on a bottom side of the surface.

27. The serving cart of claim 22, wherein the surface comprises engineered stone.

28. The serving cart of claim 22, wherein the power source comprises at least one of a battery, fuel cell, or a photovoltaic cell.

29. The serving cart of claim 22, wherein the surface is part of a serving cart.

30. A serving cart comprising:

a surface which comprises engineered stone;

at least one heating element which is used to heat the surface; and a power source which includes a portable electrical power generating device, the power source being used to provide power to the heating element.

31. The serving cart of claim 30, wherein the surface comprises between approximately 90–93 wt. % quartz.

32. The serving cart of claim 30, wherein the surface comprises between approximately 7–10 wt. % organic resin.

33. The serving cart of claim 30, wherein the power source is capable of maintaining the surface at a temperature of at least 140° F. for at least 4 hours.

34. The serving cart of claim 30, wherein the heating element is positioned on a bottom side of the surface.

35. The serving cart of claim 30, wherein the power source comprises at least one of a battery, fuel cell, or a photovoltaic cell.

36. A serving cart comprising:

a surface which comprises stone;

at least one heating element which is used to heat the surface; and a power source which provides power to the heating element.

37. The serving cart of claim 36, wherein the surface comprises quartz.

38. The serving cart of claim 36, wherein the stone is engineered stone.

39. The serving cart of claim 36, wherein the stone comprises at least approximately 2 wt. % organic resin.

40. The serving cart of claim 36, wherein the power source is a portable power source.

41. The serving cart of claim 40, wherein the power source is capable of maintaining the surface at a temperature of at least 140° F. for at least 4 hours.

42. The serving cart of claim 40, wherein the power source comprises at least one of a battery, fuel cell, or a photovoltaic cell.

43. The serving cart of claim 40, wherein the stone is engineered stone.

* * * * *

UNITED STATES PATENT AND TRADEMARK OFFICE
CERTIFICATE OF CORRECTION

PATENT NO. : 6,914,221 B1
DATED : July 5, 2005
INVENTOR(S) : Allan Witt, William Citti and David Rolston It is certified that error appears in the above-identified patent and that said Letters Patent is hereby corrected as shown below:

Column 6,
Line 51, please replace "east" with -- least --.
Line 58, please insert -- 1 -- and a comma after the word "claim."

Column 7,
Line 3, please remove the period after "F".
Line 4, please remove the dash in front of the number 4.
Line 38, please insert a comma after the number 16.

Column 8,
Lines 5, 28 and 50, please remove the period after "F".

Signed and Sealed this

Twentieth Day of September, 2005

JON W. DUDAS
*Director of the United States Patent and Trademark Office*